No. 773,837. PATENTED NOV. 1, 1904.
E. R. WHITNEY.
ELECTRIC METER.
APPLICATION FILED FEB. 29, 1904.
NO MODEL.
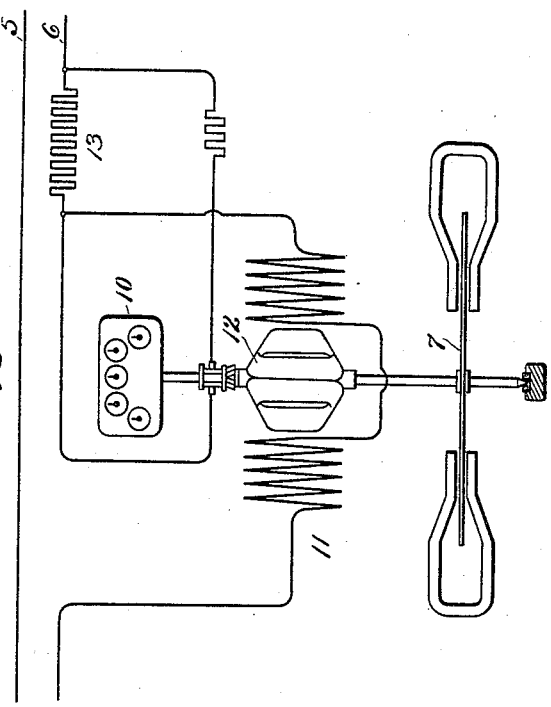
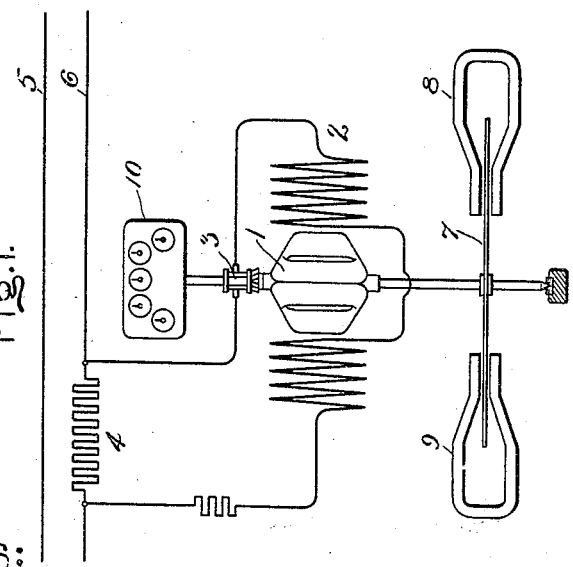
WITNESSES:
George A. Thornton
Helen Orford
INVENTOR:
Eddy R. Whitney,
By Albert G. Davis
Att'y.

No. 773,837. Patented November 1, 1904.

UNITED STATES PATENT OFFICE.

EDDY R. WHITNEY, OF LYNN, MASSACHUSETTS, ASSIGNOR TO GENERAL ELECTRIC COMPANY, A CORPORATION OF NEW YORK.

ELECTRIC METER.

SPECIFICATION forming part of Letters Patent No. 773,837, dated November 1, 1904.

Application filed February 29, 1904. Serial No. 195,711. (No model.)

*To all whom it may concern:*

Be it known that I, EDDY R. WHITNEY, a citizen of the United States, residing at Lynn, county of Essex, State of Massachusetts, have invented certain new and useful Improvements in Electric Meters, of which the following is a specification.

The heating of electric motors and similar dynamo-electric machines depends upon the square of the current carried rather than upon the first power of the current. In driving machine-tools and for similar purposes conditions are frequently encountered in which the load is of an extremely variable nature. In some cases it is therefore by the use of an ordinary ammeter a difficult matter to determine the proper size of motor requisite for the work. This is due to the fact that at best the ammeter can give only an approximate idea of the mean current value, whereas the real quantity to be determined is the square root of the mean square value of current, since upon the latter and not upon the former depends the heating of the motor. I have therefore devised an instrument which records or integrates the squares of the various current values flowing in a circuit throughout any given period. The readings of the instrument therefore furnish a measure of the heating of a machine in circuit therewith, and thus enables intelligent determination of the capacity of machine necessary for the work.

In the drawings, Figure 1 represents one embodiment of my invention, and Fig. 2 a modification.

In carrying my invention into practice I make use of a meter in which the torque is proportional to the square of the current. In order to make the revolutions of the meter proportional to this quantity, I therefore use a damping device proportional not to the square of the speed, but to the first power thereof. Such an organization is shown in Fig. 1. In this figure the armature of the meter is represented at 1 and the field-winding at 2. The armature consists of a drum-winding, as used in ordinary direct-current meters, and is provided with a commutator 3. The armature and field are connected in series with each other and are shunted about a resistance 4 in series with one of the mains 5 and 6, in which the load-current flows. A damping-disk 7 and the usual permanent magnets, such as 8 and 9, furnish the retarding torque. A counter 10 records or registers the number of revolutions of the meter.

The shunt 4 diverts the greater part of the current from the meter, thus enabling the latter to be of small size, but at the same time causes the current which does pass through the meter to be proportional to the total current. In order to render the effect of the counter electromotive force of the meter negligible, the field and armature circuit may be of considerable inherent resistance or may have an external resistance in series therewith.

If desired, in order to increase the torque of the instrument, and thus diminish the percentage of error due to friction and similar causes, I may pass the main current directly through the field-coils of the meter, as at 11 in Fig. 2, and supply only the armature, as at 12, with current diverted from the main circuit through the instrumentality of the series resistance or shunt 13. In other respects the arrangement shown in Fig. 2 is the same as that in Fig. 1.

In the foregoing description I have pointed out by way of illustration certain embodiments of my invention. It will be evident, however, that numerous variations therefrom may be made without departing from my invention.

What I claim as new, and desire to secure by Letters Patent of the United States, is—

1. In an electric meter, the combination of a motor element the torque of which is proportional to the square of the current measured, and a retarding device, the retarding effect of which is proportional to the first power of the speed of the meter.

2. An integrating-meter consisting of a motor element and a retarding device so correlated that the revolutions of the meter are proportional to the square of the current in the circuit in which the meter is used.

In witness whereof I have set my hand this 25th day of February, 1904.

EDDY R. WHITNEY.

Witnesses:
 DUGALD McK. McKILLOP,
 ALEX. F. MACDONALD.